United States Patent
Angott et al.

[11] Patent Number: 5,911,670
[45] Date of Patent: Jun. 15, 1999

[54] SELF-GUIDED LAWN MOWER

[75] Inventors: Paul G. Angott, 442 Five Gaits Ct., Bloomfield, Mich. 48304; Thomas G. Xydis, 1141 Chestnut Rd., Ann Arbor, Mich. 48104

[73] Assignees: Paul G. Angott, Bloomfield; Thomas G. Xydis, Ann Arbor, both of Mich.

[21] Appl. No.: 08/990,356

[22] Filed: Dec. 15, 1997

[51] Int. Cl.⁶ ................................................. A01D 44/12
[52] U.S. Cl. .................... 56/10.2 A; 364/424.02
[58] Field of Search ............................ 56/10.2 A, 10.2 R, 56/10.2 D; 172/2, 3, 4, 4.5, 1; 37/348, DIG. 1; 364/424.04, 424.2, 424.06

[56] References Cited

U.S. PATENT DOCUMENTS

| | | | |
|---|---|---|---|
| 3,650,097 | 3/1972 | Nokes | 56/10.2 A |
| 3,789,939 | 2/1974 | Geislinger | 56/10.2 A X |
| 4,482,960 | 11/1984 | Pryor . | |
| 4,733,355 | 3/1988 | Davidson et al. . | |
| 4,912,643 | 3/1990 | Beirxe | 37/348 X |
| 5,239,296 | 8/1993 | Jenkins . | |
| 5,524,424 | 6/1996 | Halgrimson et al. | 56/10.2 A X |
| 5,606,850 | 3/1997 | Nakamura | 56/10.2 A |
| 5,666,792 | 9/1997 | Mullins | 56/10.2 A |

*Primary Examiner*—Thomas B. Will
*Assistant Examiner*—Robert Pezzuto
*Attorney, Agent, or Firm*—Howard & Howard

[57] ABSTRACT

A vehicle central processing unit (CPU) (50) controls the power unit (16 or 18) to control the direction of movement of the carriage (12) of a lawn mower for determining the position of the lawn mower relative to locating stations (36, 38 and 40) in response to the time of movement from the counter (54) of the distance determining transmissions between the transceivers (42) at the locating stations (36, 38 and 40) and the lawn mower. The assembly is characterized by a generating circuit (60) for starting the counter (54) and generating a number of discrete subsignals to define each of the distance determining transmissions with each of the discrete subsignals being of equal velocity, a receiving circuit for stopping the counter (54) to store the number of the predetermined units for each of the subsignals, and an averaging circuit (64) for summing the number of the predetermined units for all of the subsignals in each of the distance determining transmissions and dividing by the number of the subsignals to provide the average number of the predetermined units to the central processing unit (CPU) (50) thereby providing a distance traveled time more accurate than the predetermined units. In other words and by way of example only, even though the counter (54) may only count in tenths, the averaged measurement may be in hundredths, i.e., a smaller division than the counter units.

10 Claims, 3 Drawing Sheets

SELF-GUIDED LAWN MOWER

BACKGROUND OF THE INVENTION

1. Field of the Invention

The subject invention relates to a utility vehicle which is self propelled with its path controlled by a central processing unit to follow a predetermined route, and more specifically, to a lawn mower.

2. Description of the Prior Art

The prior art includes various systems wherein a lawn mower or harvester includes sensors to position itself in an area. A distance measuring system employing ultrasonic waves is disclosed in U.S. Pat. No. 4,733,355. An electro-optical and microcomputer for automatic guidance is disclosed in U.S. Pat. No. 4,482,960. A system employing a combination of optical and radio frequency signals to determine the velocity of a vehicle is disclsosed in U.S. Pat. No. 5,239,296.

While the basic idea of measuring the time of propagation of the signal to and from a locating station is old, the implementation is complicated when a high degree of accuracy is required. In other words, the period of the counter, i.e. the clock speed that drives the counter, directly limits the accuracy for determining the position of a mower.

Practical counters can be implemented at speeds up to 5 GHz. This implies a basic count period of 200 picoseconds. Radio energy travels at the speed of light or about 300 million meters per second. In 200 pico seconds, a radio signal will travel about 6 cm. This accuracy is not sufficient for the mower which requires accuracy of 0.5 cm or better. Furthermore, while 5 GHz counters are the outside limit of available performance, 2 GHz counters are more practical. A 2 GHz counter reduces the accuracy to 15 cm, clearly unacceptable.

SUMMARY OF THE INVENTION AND ADVANTAGES

A programmable utility vehicle assembly comprising a carriage for moving over a plot and for performing a task over the plot, and a power unit for driving the carriage over the plot. First and second locating stations are disposed in spaced positions about the plot. Transmitters and receivers are included for establishing a plurality of distance determining radio frequency transmissions between the stations and the carriage. The assembly includes a counter limited in counting accuracy to predetermined time units for timing the movement of each of the distance determining transmissions. A vehicle central processing unit (CPU) controls the power unit to control the direction of movement of the carriage for determining the position of the carriage relative to the spaced positions in response to the time of movement of the distance determining transmissions between the stations and the carriage from the counter. The assembly is characterized by a generating circuit for starting the counter and generating a number discrete subsignals to define each of the distance determining transmissions with each of the discrete subsignals being of equal velocity, a receiving circuit for stopping the counter to store the number of the predetermined units for each of the subsignals, and an averaging circuit for adding the number of the predetermined units for all of the subsignals in each of the distance determining transmissions and dividing by the number of the subsignals to provide the average number of the predetermined units to the central processing unit (CPU) thereby providing a distance traveled time more accurate than the predetermined units.

Accordingly, the key to achieving high accuracy is to apply a technique used to measure voltages, called sub count resolution. Basically, a small amount of random noise is added to the data before measurement; then many sequential measurements are made. From statistics, it is known that when these measurements are averaged, the resulting accuracy is improved by the square root of the number of measurements made. The key to this result is that the average value of the noise added is zero and the noise added to each measurement is uncorrelated to the other measurements. This is met in the implementation of the subject invention by averaging samples or subsignals for each measurement transmission.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
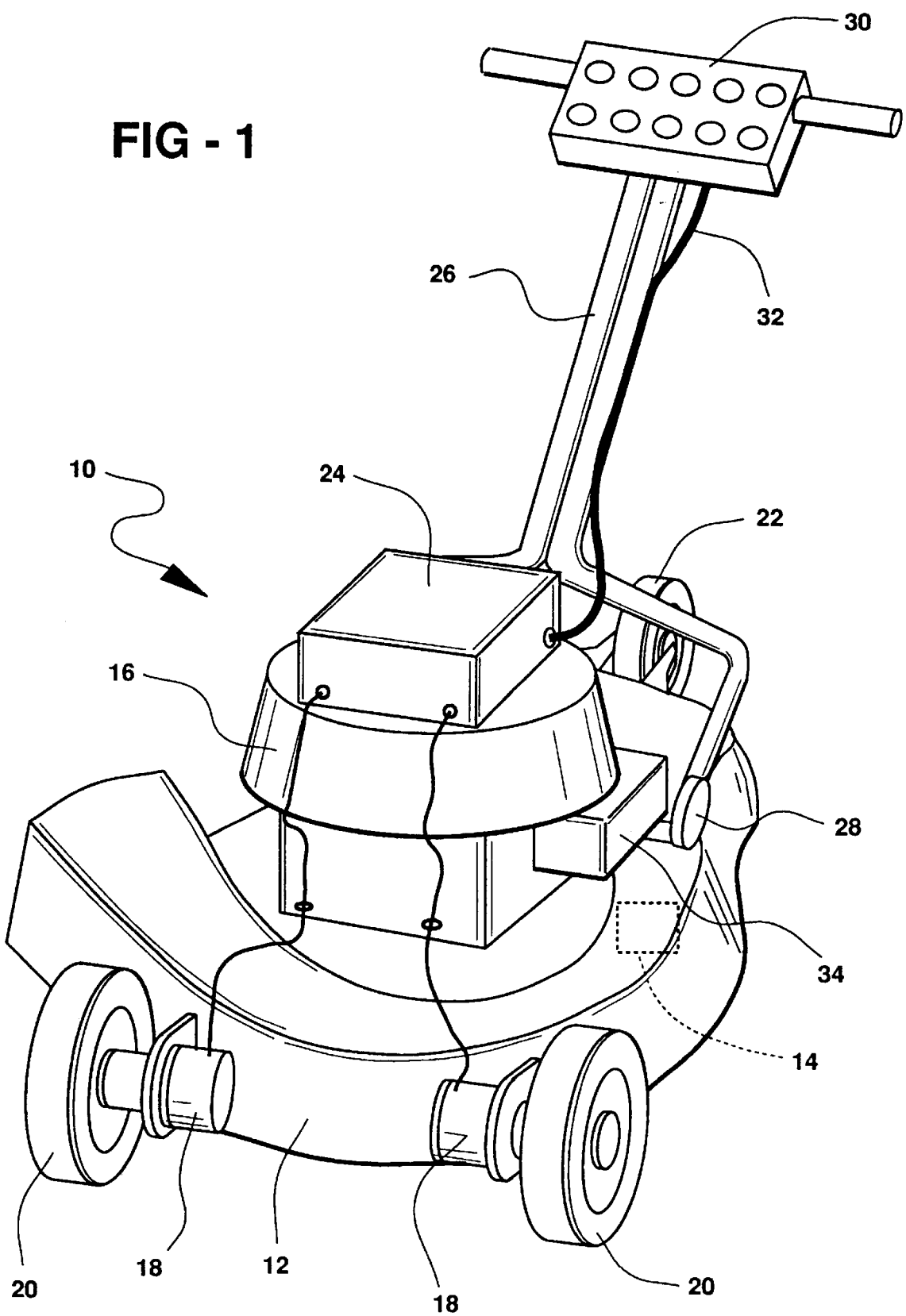
FIG. 1 is a perspective view of a lawn mower incorporating the subject invention.
Figure 2:
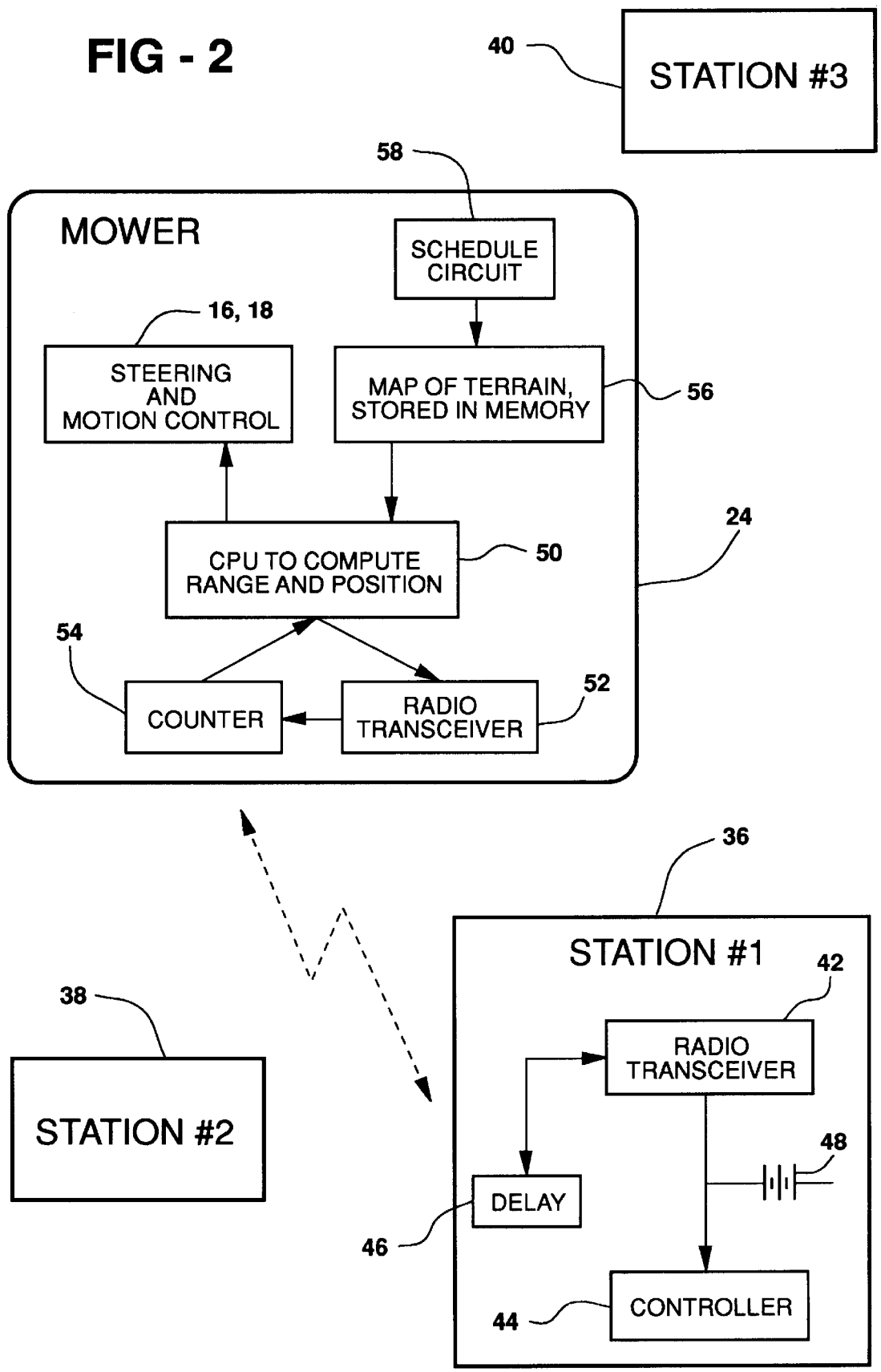
FIG. 2 is a schematic view of the system deployed on a lawn.

Referring to the Figures, wherein like numerals indicate like or corresponding parts throughout the several views, a programmable utility vehicle assembly in the form of a lawn mower is generally shown at 10. The lawn mower assembly 10 comprises a carriage or frame 12 for moving over a lawn or other plot and a cutting device or blade 14 is supported by the carriage 12 for cutting a lawn or performing some other task on the plot. A power unit is disposed on the carriage 12 for driving or propelling the carriage 12 over the lawn and for rotating the blade. More specifically, the power unit includes an electric motor 16 for rotating the blade and electric motors 18 for rotating wheels 20. The carriage 12 is also supported by caster wheel 22 so that differential, forward and reverse rotation of the electric motors and wheels 20 steer the carriage 12 in very tight circles. A mower electronics package 24 is supported on the carriage 12 for controlling the electric motors 16 and 18 which comprise the power unit to control the direction of movement of the carriage 12.

A steering device or handle 26 is removably attached to the carriage 12 by quick disconnects 28 and supports a programming pad 30 for programming the electronics package 24. The steering handle 26 may also be collapsible. The pad 30 of the steering handle 26 includes an electronic serial number and a connector 32 for sending the serial number to the electronics package 24 to allow the electronics package 24 to be programmed. In other words, the electronic serial number acts as a key to initiate operation. The assembly 10 also includes a rechargeable battery pack 34.

Also included are at least first and second locating stations, i.e., a plurality of at least three 36, 38 and 40 to be disposed in spaced positions about the plot of ground, e.g., a lawn. Each locating station may comprise a post in the ground or a storage shed, or the like. Although only one complete locating station is illustrated, each locating station 36, 38 and 40 includes a transceiver 42, a controller 44, a delay circuit 46 and a battery 48.

The electronics package 24 includes a central processing unit 50 and a transceiver 52. Therefore, the transceivers 42 and 52 establish a plurality of distance determining radio frequency transmissions between the locating stations 36, 38 and 40 and the carriage 12.

The electronics package 24 further includes a counter 54 limited in counting accuracy to predetermined time units for timing the movement of each of the distance determining transmissions. The vehicle central processing unit (CPU) 50 controls the motors 16 and 18 of the power unit to control the direction of movement of the carriage for determining the position of the carriage relative to the locating stations 36, 38 and 40 in response to the time of movement from the counter 54 of the distance determining transmissions between the transceivers at the locating stations 36, 38 and 40 and the central processing unit (CPU) 50 at the carriage 12. The electronics package 24 also includes a mower memory circuit 56 for storing the route over which the mower is to pass. The memory may be acquired by manually steering the mower over the lawn to set up the first pass. Once the route is in the memory circuit 56, a schedule of mowing instances can be programmed and stored in a scheduling circuit 58.

Figure 3:
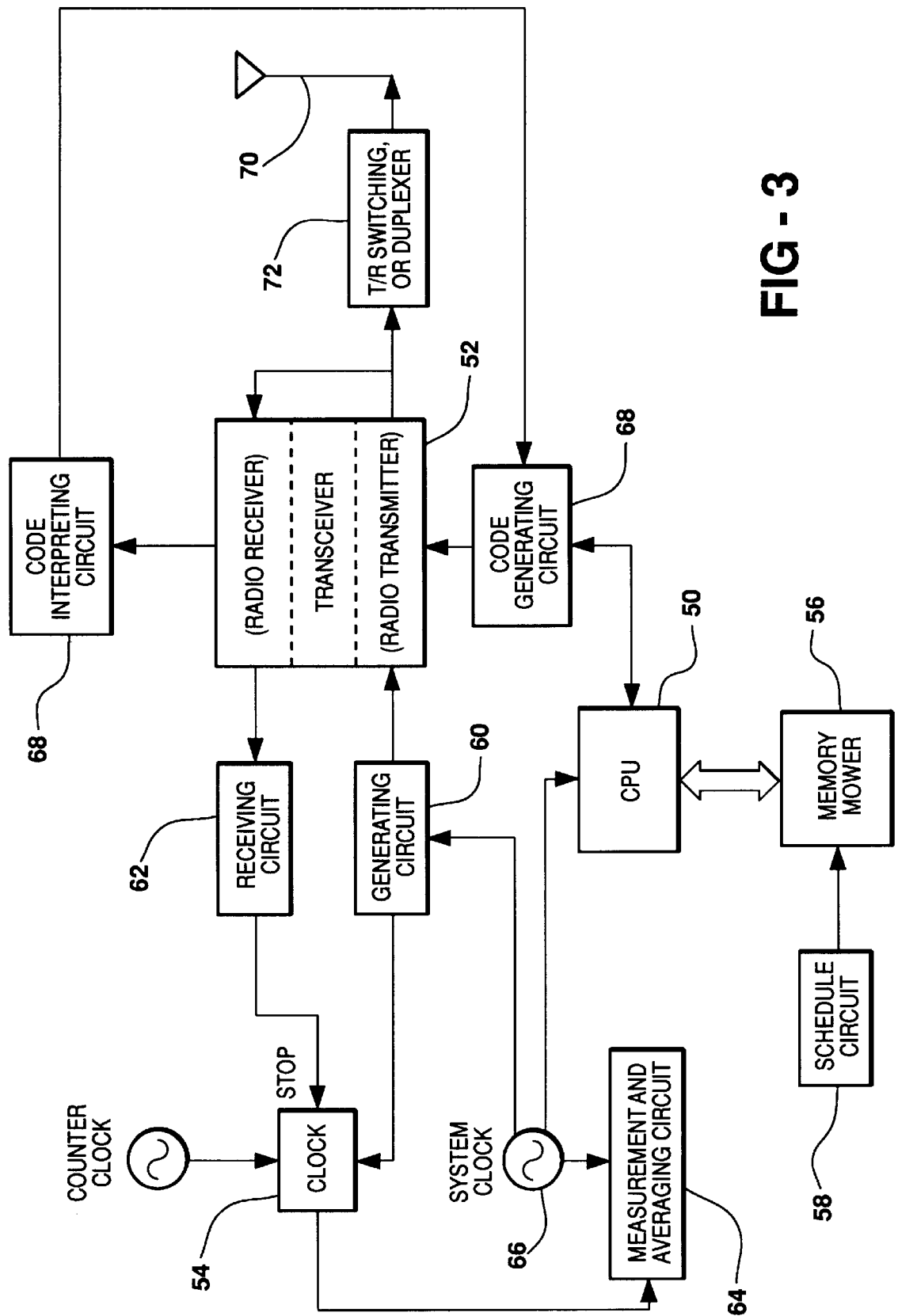
FIG. 3 is a block diagram of the circuits employed in the subject invention.

Turning to FIG. 3, the assembly is characterized by a generating circuit 60 for starting the counter 54 and generating a number discrete subsignals to define each of the distance determining transmissions with each of the discrete subsignals being of equal velocity. Further, a receiving circuit 62 stops the counter 54 to store the number of the predetermined units for each of the subsignals, and an averaging circuit 64 sums the number of the predetermined units for all of the subsignals in each of the distance determining transmissions and dividing by the number of the subsignals to provide the average number of the predetermined units to the central processing unit (CPU) 50 thereby providing a distance traveled time more accurate than the predetermined units.

The electronics package 24 includes a system clock 66 for initiating the generating circuit 60 to start the counter 54 and the transmission by the transmitter portion of the transceiver 52. The system clock 66 is operatively connected to the generating circuit 60, the generating circuit 60 being operatively connected respectively to the counter 54 and a first 52 of the transceivers, ie.e., the mower or CPU transceiver. The receiving circuit 62 operatively interconnects the mower transceiver 52 and the counter 54. The averaging circuit 64 is operatively connected to the system clock 66 and to the counter 54. The central processing unit (CPU) 50 is operatively connected to the system clock 66. A code circuit 68 operatively interconnects the central processing unit (CPU) 50 and the transceiver 52 for identifying each of the distance transmissions.

Accordingly, the mower is contained in a region or a plot which also contains two or more (preferably three) locating stations. The mower has a radio transceiver, and a high speed counter. To determine its position, the mower transmits a message to the first locating station. This message does the following: it activates a battery saving wake-up circuit and informs the locating station that it will soon be interrogated for position information. The locating station then responds to the mower that it is ready. Then the mower transmits a predefined defined pulse, or a pulse sequence. The actual characteristics of the signal are unimportant; what is important is that it must allow the system to measure the time that this signal is received.

When the locating station receives the pulse signal, it waits a predetermined length of time, sufficient to allow it to get ready to respond. The locating station transmits another predetermined pulse signal back to the mower. Typically, these two signals will be identical. By starting a counter when the signal is first transmitted, and stopping it when the second signal is received, the mower can determine its distance from the locating station. This is given by the count value multiplied by the clock period used by the counter. By repeating this operation for three locating stations, the mower can determine its position.

Following is a simple example that demonstrates the principle of Sub Count Resolution, used in the radio frequency guidance system of the mower to significantly improve accuracy. In actual practice, one hundred (100) samples of the data are taken for each distance calculation. The theory of Sub Count Resolution is that the accuracy of the data improves as the square root of the number of samples. For the mower, this would improve accuracy by a factor of 10 to 1.

By way of analogy, there are twenty (20) runners in a 100-yard dash and all of them run the race in 9.4 seconds. Also, assume that the stop watch that times the runners only has accuracy in seconds. The time recorded for each runner would be 9 seconds because the nearest choices are 8, 9 or 10 seconds, and 9 seconds is the closest to the real time. Next assume that there are four (4) runners in the group that start earlier or later than the other sixteen (16) runners. Following are their recorded times and average time. The runners are 1, 2, 3 and 4. In the example, t=9.4 seconds.

|  | Start Time | Real Time | Timer Time |
|---|---|---|---|
| 1 | t + .5 | 9.9 | 10 |
| 2 | t − .5 | 8.9 | 9 |
| 3 | t + 1 | 10.4 | 10 |
| 4 | t − 1 | 8.4 | 8 |
| Sum | t + 0 | 37.6 | 37 |
| Average | t + 0 | 9.4 | 9.25 |

The average of these times is 9.25 seconds, which improves the accuracy of the result from 9 seconds to 9.25 seconds, which is much closer to the actual time of 9.4 seconds.

Now, to do this same example for all twenty (20) runners, the start times are varies in increments of 0.1 seconds:

|  | Start Time | Real Time | Timer Time |
|---|---|---|---|
| 1 | t − 1 | 9.3 | 9 |
| 2 | t − .2 | 9.2 | 9 |
| 3 | t − .3 | 9.1 | 9 |
| 4 | t − .4 | 9.0 | 9 |
| 5 | t − .5 | 8.9 | 9 |
| 6 | t − .6 | 8.8 | 9 |
| 7 | t − .7 | 8.7 | 9 |
| 8 | t − .8 | 8.6 | 9 |
| 9 | t − .9 | 8.5 | 9 |
| 10 | t − 1 | 8.4 | 8 |
| 11 | t + .1 | 9.5 | 10 |
| 12 | t + .2 | 9.6 | 10 |
| 13 | t + .3 | 9.7 | 10 |
| 14 | t + .4 | 9.8 | 10 |
| 15 | t + .5 | 9.9 | 10 |
| 16 | t + .6 | 10.0 | 10 |
| 17 | t + .7 | 10.1 | 10 |
| 18 | t + .8 | 10.2 | 10 |

-continued

| | Start Time | Real Time | Timer Time |
|---|---|---|---|
| 19 | t + .9 | 10.3 | 10 |
| 20 | t + 1 | 10.4 | 10 |
| Sum | t + 0 | 188 | 189 |
| Average | | 9.4 | 9.45 |

In this example, the accuracy improved to within 5% of the real time of 9.4 seconds.

In the example, the start times are varied by plus or minus the same amount of time so that they effectively cancelled each other out. In practice, the start times will be randomly varied, but the net effect of these start times will also cancel each other out.

In the mower, one limiting factor that determines accuracy is the counter. Following is the reasoning for the accuracy limitation.

Timing accuracy is defined as follows:

$$\frac{\text{RF Propagation Speed}}{\text{Counter Speed}}$$

$$\frac{(186{,}000\,\text{miles/sec}\,(\text{RF propagation speed}))\times 5280\,\text{feet/mile}\times 12\,\text{inches/foot})}{(2.4\,\text{Gigahertz}\,(\text{Counter Speed}))}$$

$$= \frac{1.86\times 10^5 \times 5.28\times 10^3 \times 1.2\times 10^1}{2.0\times 10^9\,\text{cycles/sec}}$$

$$= 5.9\,\text{inches/cycle}$$

This would improve to 0.60 inch accuracy with one hundred (100) samples because the accuracy would improve by a factor of 10:1. In round numbers, this accuracy of ~+/−¼ inch. It therefore follows that the accuracy at 5 Gigahertz is 2.4 inches/cycle, which improves to 0.12 inches with one hundred (100) samples. This accuracy of ~+/−¹⁄₁₆ inch.

An antenna 70 is connected to both the transmitter and receiver. Either a duplexer or a T/R switch 72 can make this connection. Both devices are well known. A duplexer allows a transmitter and receiver to share the same antenna if transmitted on different frequencies. A T/R (transmit-receive) switch is an RF switch, most commonly used when the transmitter and receiver share the same frequency and antenna. The radio system is planned to operate in the 2.5 GHz Industrial-Scientific-Medical (ISM) band of frequencies authorized by the FCC.

The count value is sent to the measurement and averaging circuit upon the receipt of each stop command. This device computes a running average until instructed to stop by the CPU.

The data from this circuit is provided to the CPU, which communicates with the rest of the memory mower as follows: when the mower wants to update its position, it issues a command to the CPU, which poles each locating station and determines its range. The CPU then reports the range data from each locating station to the memory mower.

The memory mower can also issue a command to the CPU to communicate by radio to the locating stations, a fence door, storage shed, or other peripheral devices.

The locating station electronics are normally in a low current inactive state. Periodically, the receiver and wake up detect circuit of the guide unit is activated for a short time. If during this time the guide unit sees a wake-up signal, it activates the rest of the electronics and then transmits a response. This wake-up procedure occurs only at the beginning of a mowing session. Thereafter, the electronics are kept on until the mower commands the locating stations to go back to sleep. For further battery saving, the locating stations may only search actively when they are programmed by the mower to know that a mowing session is likely, and search less often at other times. Each locating station 36, 38 and 40 also includes a controller 44.

Accordingly, the invention includes a method of guiding a utility vehicle carriage 12 over a plot having a plurality of locating stations 36, 38 and 40 disposed in spaced positions about the plot by establishing a plurality of distance determining radio frequency transmissions between the locating stations and the vehicle carriage 12, timing the movement of each of the distance determining transmissions with a counter limited in counting accuracy to predetermined time units, and determining the position of the carriage relative to the locating stations in response to the time of movement from the counter of the distance determining transmissions between the locating stations and the carriage in a vehicle central processing unit (CPU) 50. However, the method is characterized by generating a number discrete subsignals to define each of the distance determining transmissions with each of the discrete subsignals being of equal velocity, starting and stopping the counter to store the number of the predetermined units for the transmission of each of the subsignals, and summing the number of the predetermined units for all of the subsignals in each of the distance determining transmissions and dividing by the number of the subsignals in that respective distance determining transmission to provide the average number of the predetermined units in that respective distance determining transmission to the vehicle central processing unit (CPU) thereby providing a distance traveled time more accurate than the predetermined units.

In the specific sense, transmitting each distance determining transmission from the counter to a transceiver and returning the transmission from the transceiver back to the counter and dropping out of the counter the time for returning the transmission to obtain only transmission counts. In other words, each distance measuring transmission, is actually two discrete signals, one to the locating station and one back to the CPU.

The measurements will be uncorrelated because of the way that the data is collected. In particular, the counter has an independent clock which samples the pulse when it is transmitted as well as when it is received. Since the pulse is generated by a different clock than the counter uses, the phase noise from the two will be randomly different. Furthermore, the locating station will sample the incoming signal with still another clock and then transmit a response with this clock. By the Central Limit Theorem, actual knowledge of the statistics of the clock jitter relative to each other is not needed, only the properties discussed above.

The user of separate clocks is unconventional and actually counterintuitive from an engineering standpoint. The natural approach is to make the generation of the pulse synchronous with the start of the counter. The approach of using independent clocks increases the noise (randomness) of each individual measurement. This reduces the accuracy of each individual measurement. However, due to the average, accuracy is actually increased.

In practice, the averaging will be implemented by having the mower transmit 100 or more sequential pulses, which will be repeated by the locating stations. Then the mower will average the returns for the accuracy improvement indicated above.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A programmable utility vehicle assembly comprising;

a carriage for moving over a plot, a device supported by said carriage for performing a task over the plot, a power unit for driving said carriage over the plot, first and second locating stations to be disposed in spaced positions about the plot, transceivers for establishing the movement of a plurality of distance determining radio frequency transmissions between said stations and said carriage, a counter limited in counting accuracy to predetermined units of time for timing said movement of each of said distance determining transmissions, and a vehicle central processing unit (CPU) controls the power unit to control the direction of movement of the carriage for determining the position of the carriage relative to said locating stations in response to the time of movement from said counter of said distance determining transmissions between said transceivers at said locating stations and said carriage, said assembly characterized by a generating circuit for starting said counter and generating a number of discrete subsignals to define each of said distance determining transmissions with each of said discrete subsignals being of equal velocity, a receiving circuit for stopping said counter to store an number of said predetermined units for each of said subsignals, and an averaging circuit for summing said number of said predetermined units for all of said subsignals in each of said distance determining transmissions and dividing by the number of said subsignals to provide the average number of said predetermined units to said central processing unit (CPU) thereby providing a distance traveled time more accurate than said predetermined units.

2. An assembly as set forth in claim 1 including a system clock for initiating said generating circuit to start said counter and said transmissions.

3. An assembly as set forth in claim 1 including a system clock operatively connected to said generating circuit, said generating circuit being operatively connected respectively to said counter and a first of said transceivers.

4. An assembly as set forth in claim 3 including a receiving circuit operatively interconnecting said first transceiver and said counter.

5. An assembly as set forth in claim 4 wherein said averaging circuit is operatively connected to said system clock and to said counter.

6. An assembly as set forth in claim 5 wherein said central processing unit (CPU) is operatively connected to said system clock.

7. An assembly as set forth in claim 6 including a memory circuit for memorizing a route over the plot to repeatedly follow the route.

8. An assembly as set forth in claim 7 including a code circuit operatively interconnecting said central processing unit (CPU) and said transceivers for identifying each of said distance transmissions.

9. A method of guiding a utility vehicle carriage over a plot having a plurality of locating stations disposed in spaced positions about the plot, said method comprising the steps of;

establishing the movement of a plurality of distance determining radio frequency transmissions between the locating stations and the vehicle carriage, timing the movement of each of the distance determining transmissions with a counter limited in counting accuracy to predetermined units of time, and determining the position of the carriage relative to the locating stations in response to the time of movement from the counter of the distance determining transmissions between the locating stations and the carriage in a vehicle central processing unit (CPU), said method characterized by generating a number discrete subsignals to define each of the distance determining transmissions with each of the discrete subsignals being of equal velocity, starting and stopping the counter to store the number of the predetermined units for the transmission of each of the subsignals, and summing the number of the predetermined units for all of the subsignals in each of the distance determining transmissions and dividing by the number of the subsignals in that respective distance determining transmission to provide an average number of the predetermined units in that respective distance determining transmission to the vehicle central processing unit (CPU) thereby providing a distance traveled time more accurate than the predetermined units.

10. A method as set forth in claim 9 including transmitting each distance determining transmission from the counter to a transceiver and returning the transmission from the transceiver back to the counter and dropping out of the counter the time for returning the transmission to obtain only transmission counts.

* * * * *